Aug. 14, 1956   J. W. HARTZELL ET AL   2,759,173
DEVICE FOR DETECTING A RAPID RATE OF CHANGE
Filed Sept. 3, 1953
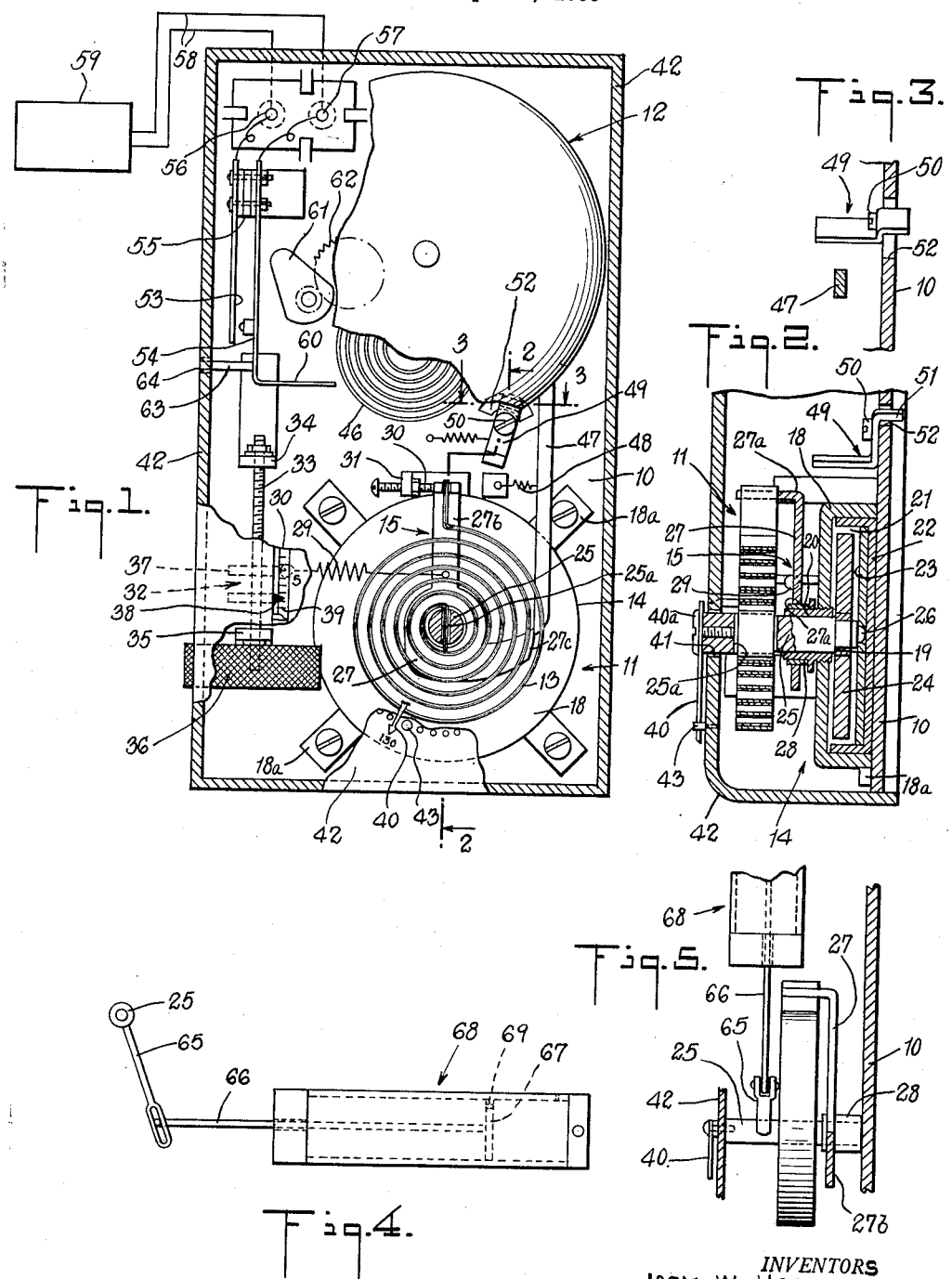
INVENTORS
JACK W. HARTZELL
PHILIP H. HASELTON
BY
Campbell, Brumbaugh, Free & Graves
ATTORNEYS United States Patent Office 2,759,173
Patented Aug. 14, 1956

2,759,173

DEVICE FOR DETECTING A RAPID RATE OF CHANGE

Jack W. Hartzell, Madison, and Philip H. Haselton, Short Hills, N. J.

Application September 3, 1953, Serial No. 378,346

20 Claims. (Cl. 340—227)

This invention relates to devices sensitive to rate of change of input energy and more particularly to devices sensitive to the rate of change of parameters such as temperature, pressure, and the like.

Devices which sense rate of change of temperature, for example, have been applied to fire alarm systems to trip the alarm mechanism when the localized rate of change exceeds the ambient rate of change, thus setting off the alarm sooner than would be possible in the event the system were arranged to respond only to a preestablished maximum temperature. A conventional way of achieving a response to rate of change of temperature is by the use of a pair of bimetallic elements disposed side by side not touching one another and with one more exposed to the potential source of heat than the other. When the rate of change of temperature is slow both bimetallic elements are warmed to about the same degree and therefore bend at the same rate so that they do not touch. When the rate of change of temperature is more rapid, however, the bimetallic element nearest this source of heat will bend more rapidly, eventually catching up with the least exposed element until contact is made to actuate the alarm system.

In addition to requiring more than one bimetallic element, temperature sensing devices of the type described above are able to do very little work, that is the contact pressure between the two bimetallic elements tends to be gentle so that costly boosters such as electrical relay systems are required to actuate the alarm. Moreover, adjustment of the sensitivity to rate of change is not easily effected, this being particularly difficult to accomplish in the field.

It is accordingly one object of the present invention to provide a new and improved rate of change sensing mechanism.

Anther object of the invention is to provide a simplified and highly effective instrument sensitive to rate of change of input energy.

Another object of the invention is to provide an inexpensive rate of change sensing instrument for use as the control element in fire alarm systems and the like and in which adjustment of all conditions to be sensed may be effected with ease and accuracy.

Another object of the invention is to provide a rate of change sensing device in which but a single sensing element is required.

Another object of the invention is to provide an improved sensing instrument responsive to rate of change of parameters such as temperature, pressure and the like in which a high energy work output is attained without the use of complex electrical or mechanical energy amplifying systems.

Yet another object of the invention is to provide an improved and simplified fire alarm system sensitive both to rate of change of temperature and to preestablished maximum temperatures and embodying either mechanical or electrical alarm means or both.

In accordance with the invention a single sensing element may be provided having first and second portions which are movable relatively to each other as a function of the parameter to be sensed. The element is mounted so that the relatively movable portions are opposed respectively by first and second yieldable motion-opposing means which react against each other through the element when the latter is in motion. The motion-opposing means are arranged to provide reaction forces which vary differently as a function of the rate of movement of the portions of the element and consequently one portion of the element will be permitted to move more than the other when the relative movement is rapid, and less than the other when the relative movement is slow. Thus the device is selective and by connecting work output means to either or both portions of the sensing element, a source of work output energy representative of the rate of change as well as maximum or minimum values of the parameter to be sensed is achieved.

In the event a fire alarm system is provided, electrical or mechanical controls or both may be provided. In the latter case the electrical and mechanical controls may be so integrated in accordance with the invention that one will serve as a check on the other.

These and other features and objects of the invention may be better understood by reference to the accompanying drawings of one embodiment of the invention in which:

Figure 1 is a plan view of a temperature responsive device formed in accordance with the present invention and showing several of the component parts broken away to expose the inner workings;

Figure 2 is a view in vertical section taken on the line 2—2 of Figure 1 looking in the direction of the arrows;

Figure 3 is a view in transverse section taken on the line 3—3 of Figure 1 looking in the direction of the arrows; and Figures 4 and 5 are side and end views respectively of a modified arrangement of a device affording a reaction force against a moving part of the sensing element.

Referring first to Figures 1 and 2, the invention is illustrated as embodied in a fire alarm system responsive both to rate of change of temperature and to preestablished maximum temperature. The device may include a frame or base 10 on which are mounted a sensing system indicated generally by the numeral 11 and an alarm system 12 connected to be controlled thereby.

The sensing system 11 includes a sensing element, which may be in the form, for example, of a bimetallic spiral 13 the inner and outer ends of which are adapted to partake of relative movement as a function of temperature. The element 13 may be connected at its inner end to a first yieldable motion-opposing mechanism 14 and at its outer end to a second yieldable motion-opposing mechanism 15, the two being adapted to react against one another through the agency of the element 13 which is otherwise free of support.

The first motion-opposing mechanism 14 may take the form of dash pot means such as a cup-shaped housing 18 secured to the base 10, as by tabs 18a, and having formed in its upper surface an aperture 19 into which a bearing bushing 20 is threaded in fluid-tight relationship. Secured to the housing 18 in fluid-tight relationship therewith to define a closed cavity 21 is a cover 22 which carries an inner bearing plate 23. The cavity 21 is adapted to be filled with a fluid medium, preferably of a highly viscous nature. Various silicone compounds have been found to be an excellent material for the medium. Immersed in the fluid medium within the cavity 21 is a rotor 24 carried by the inner end of a shaft 25 which is rotatably journalled in the bushing 20 with its tip 26, which is of reduced diameter, finding a bearing in the plate 23. The inner end of the bushing 20 projects for a slight distance into the cavity 21 to provide a bearing preventing axial movement of the shaft to the left as viewed in Figure 2.

The shaft 25 near its upper end is formed with a slot 25a into which the inner end of the sensing element 13 is inserted so that expansion and contraction of the sensing element 13 will cause the shaft 25 to turn. The turning movement of the shaft will, however, be opposed by the motion-opposing mechanism 14 or more particularly by the drag of the fluid medium on the rotor 24 and its motion will thus be opposed by a force which varies as a function of the attempted rate of movement of the shaft.

The second motion-opposing mechanism 15 may be in the form of a plate member 27 centrally apertured at 27a to receive a sleeve 28 which fits over the bushing 20 for free turning movement thereon about an axis coincident with that of the shaft 25. The plate and sleeve assembly may be constrained against axial movement by the surface of the housing 18 and by the inner end of the sensing element 13. The plate 27 is formed with a radial arm 27b, the free end of which may be slotted to receive the outer end of the sensing element 13, and resilient means in the form of a spring 29 is connected to react between the base 10 and the plate member 27 to urge the latter in a counterclockwise direction as viewed in Figure 1. To limit the turning movement of the plate member 27 in a counterclockwise direction, an adjustable abutment in the form of a screw 30 threaded into a boss 31 carried by the base 10 may be provided. By adjusting the screw 30, one extreme angular position of the plate member 27 may be established, this adjustment facilitating the setting of the trip linkage for the alarm system 12 as will be described below.

The resilient means 29 is preferably connected to the base 10 through a reaction force adjusting mechanism 32 comprising a lead screw 33 journalled in bosses 34 and 35 and carrying an adjusting knob 36. Threaded on the lead screw 33 for movement axially thereof is a carriage 37 to which the resilient member is attached. The lead screw 33, which is substantially transverse to the axis of the resilient member 29, will cause the tension of the latter to be adjusted to an extremely fine degree, in this fashion adjusting the rate of change response of the device as described below. The position of the carriage 37 may be indicated by means of a pointer 38 carried thereby and working in conjunction with stationary calibrations 39.

It will now be apparent that the sensing element 13, when its inner and outer portions move relative to each other under the influence of heat, will cause the first motion-opposing means 14 to react with the second motion-opposing means 15, or more specifically the resilient member 29 will be resisting movement of the outer end of the sensing element 13 while the damped rotor 24 will be resisting movement of the inner end.

Since the two motion- opposing means 14 and 15 put up resistances which differ from each other as a function of the rate of the relative movement of the inner and outer portions of the sensing element 13, either of two things may happen. If the rate of change of the parameter, in this case temperature, is rapid the relative motion of the inner and outer portions of the sensing element will be such that the first and more varying motion-opposing means 14 will exert such a large reaction force that the plate member 27 will be turned in a clockwise direction as viewed in Figure 1, overcoming the resilient member 29 of the second motion-opposing means 15. If on the other hand the rate of change is slow and the relative movement between the inner and outer portions of the sensing element 13 is slow, the first motion-opposing means will yield, that is the rotor 24 will slip in its fluid medium and the plate member 27 will be held immobilized by the resilient member 29.

This selective reaction may be used to trigger an alarm system, for example, or any other system in which its unique action in which rate of change is detected might be useful.

Response to an extreme condition, regardless of the rate of change involved in the reaching of that condition, may be achieved by means of an adjustable stop mechanism for the inner portion of the sensing element 13. This stop mechanism may take the form, for example, of an arm 40 secured by a screw 40a to the upper end of the shaft 25, which projects through an opening 41 in a cover 42 for the instrument, which cover may be perforated to facilitate the passage of air currents. The arm thus turns with the shaft 25 and its motion may be arrested at any desired point by means of a stop pin 43. When the arm engages the stop pin, the effective resistance of the first motion-opposing means 14 is increased and any further change in the parameter being sensed, regardless of the rate of change, will cause the second motion-opposing means 15 to yield, that is the plate member 27 will be turned. To vary this setting, the stop pin 43 may be shifted angularly as by the use of a series of holes 44 in the cover 42. It will be understood that the holes, being visible externally of the device, serve as calibrations indicative of the value of the parameter being sensed, in this case temperature, and the pin 43 serves as a maximum temperature setting means.

By properly balancing the several parts, the device may be made so that it is virtually unaffected by gravity. Thus, the device may be attached to a wall, ceiling or floor and in any orientation, or it may be used in applications in which its position changes while in operation.

The alarm system 12, which together with the plate member 27 may be regarded as the work output portion of the device, may include a bell 45 which may be furnished with a manual wind-up motor having a coil spring 46 and a control lever 47. The lever 47, which is shown in Figure 1 in its off position, is adapted to swing to the left under the influence of a spring 48 to set off the bell. The lever 47 may be linked to the sensing element 13 by means of an arm 27c of the plate member 27, the free end of the arm 27c being interposed in the path of movement of the lever. With the amount of overhang of the lever 47 on the arm 27c being controlled by the abutment screw 30, it will be seen that the bell will be set off when the plate 27 is turned in clockwise direction by the sensing element 13. Resetting is effected by means of a reset lever 49 pivoted at 50 to the base 10 and formed with a finger 51 which projects through an opening 52 in the base to be accessible externally. By swinging the lever 49 in a counterclockwise direction as viewed in Figure 1 the bell lever 47 will be returned to the shut-off position engaging the member 27.

The alarm system 12 may also include an electrical system integrated with the mechanical system described above. In accordance with the invention there may be provided a pair of relatively movable contact arms 53 and 54 mounted on an insulating base 55 and electrically connected to binding posts 56 and 57, respectively. The binding posts may in turn be connected by an electrical conduit 58 to one or more electrical alarm bells or other indicator means 59. It will be understood that in a fire alarm system a plurality of sensing elements, arrayed throughout the building to be protected may be connected to a common alarm or to many alarms throughout the building.

The movable contact arm 54 is provided with a foot portion 60, which is interposed in the path of expansion of the coil spring 46 for the mechanical bell so that as the bell spring unwinds the contact arms 53 and 54 will be brought into engagement and the electrical circuit to the alarm 59 will be completed. Alternatively, a cam 61 may be rotatably mounted adjacent the movable contact arm 54 to be driven by a gear 62 of the bell motor so that when the bell is ringing the cam 61 will rotate and cause contact arm 54 to engage the contact arm 53 to make and break the electrical circuit in a preestablished pattern. By selecting different cams for different detecting stations the occupants of the building will be able to tell immediately which of the sensing or detecting devices has detected fire. When the cam 61 is used for closing the electrical circuit, the arm 60 will be shortened so that the spring 46 of the bell motor will close the contacts permanently only after the motor becomes unwound. The electrical system may therefore be used to indicate when the wind-up motor requires attention.

A supplemental visual indicator for the condition of the wind-up motor may be provided in the form of a flag member 63, preferably painted red, and disposed in the path of expansion of the spring 46 so that as the latter becomes unwound the flag member 63 will be pushed out through a hole 64 in the cover member 42 to be visible externally.

It will be understood that the various types of motion-opposing means may be used in place of the viscous fluid means described above. Thus, for example, dash pot means such as shown in Figures 3 and 4 may be used. In these figures certain of the components are identical to those of Figures 1 and 2 and are therefore identified by like reference numerals. In this arrangement the shaft 25 carries a radius arm 65 to the slotted free end of which is coupled a piston rod 66 connected to a piston 67 which moves within a cylinder 68. The piston 67 is formed with a small vent 69 through which the fluid medium within the cylinder 67, such for example as air, may pass at a limited rate. Thus, slow movement of the piston within the cylinder will meet with relatively little resistance, whereas rapid movement will meet with relatively greater resistance.

Other damping or high inertia means may also be used to afford reaction forces which vary as a function of velocity. Thus a high inertia gear train, an escapement mechanism, or magnetic damping may be used, the invention requiring only that the two motion-opposing means, against which the sensing element reacts, afford reaction forces which vary as a function of input velocity so that slow movement will overcome one and fast movement will overcome the other. In this connection, it will be understood that both motion-opposing means may take the form of dash pot means affording different reaction force characteristics in accordance with the foregoing disclosure. In this fashion an integrating device for rates of change may be provided.

Moreover, numerous types of sensing elements may be used depending upon the parameter which is being used to operate the device. For example, a pressure response element such as the expandable tube of a Bourdon gage may be used in place of the bimetallic element 13. To apply the invention it is necessary to provide an actuating element which has two relatively movable portions which are so connected that they react against each other when in motion. The invention should not, therefore, be through of as limited except as defined by the following claims.

We claim:

1. A sensing device comprising a frame, sensing means having first and second portions which are movable relatively to the frame and to each other as a function of a parameter to be sensed and which are operatively connected to react against each other upon movement, and first and second yieldable motion-opposing means mounted on the frame to react against the first and second portions respectively of the sensing means and hence against each other through the agency of the sensing means, at least one of said yieldable motion-opposing means having the ability to retain any position into which it is forced, said first and second motion-opposing means being constructed and arranged to afford reaction forces which vary differently as a function of the velocity of the relative movement of said portions, whereby a low rate of change of the parameter to be sensed will move one motion-opposing means more than the other and a higher rate will move the other more than the one.

2. A sensing device comprising a frame, sensing means having first and second portions which are movable relatively to the frame and to each other at a rate which is a function of a parameter to be sensed and which are operatively connected to react against each other upon relative movement, first yieldable motion-opposing means connected to the first portion of the sensing means to react against movement thereof, and second yieldable motion-opposing means connected to the second portion of the sensing means to react against movement thereof, the first and second motion-opposing means thereby being operatively connected through the agency of the sensing means to react against each other, said first motion-opposing means having the ability to retain any position into which it is forced and being constructed and arranged to afford a reaction force which varies as a function of the velocity of the input motion, and said second motion-opposing means being constructed and arranged to afford a reaction force which overcomes that of the first for a low rate of relative movement of the said portions of the sensing means and which is overcome by the first for a more rapid rate of relative movement.

3. A sensing device comprising sensing means including portions which are relatively movable as a function of a parameter to be sensed, first and second yieldable motion-opposing means mounted to react against each other through the agency of the relatively movable portions of the sensing means, said first motion-opposing means having the ability to retain any position into which it is forced and affording a reaction force characteristic which varies as a function of the velocity of the relative movement of the said portions of the sensing means and which differs from the reaction force characteristic of the second motion-opposing means, and work output means connected to one of the portions of the sensing means.

4. A sensing device comprising sensing means including portions which are relatively movable as a function of a parameter to be sensed, first and second yieldable motion-opposing means mounted to react against each other through the agency of the relatively movable portions of the sensing means, said first motion-opposing means having the ability to retain any position into which it is forced and affording a reaction force characteristic which varies as a function of the velocity of the relative movement of the said portions of the sensing means and which differs from the reaction force characteristic of the second motion-opposing means, work output means connected to one of the portions of the sensing means, and abutment means in the path of movement of the other of said portions of the sensing means to limit the travel thereof and cause actuation of the work output means through the motion of said one portion.

5. A sensing device responsive to rate of change of a given parameter comprising a frame, a sensing member having first and second portions movable relatively to the frame and movable relatively to each other as a function of the parameter to be sensed, resilient means reacting between the frame and the first portion to oppose the movement thereof, dash pot means connected to oppose the movement of the second portion, said resilient means and dash pot means reacting against each other through the agency of said member, and work output means connected to one of said portions.

6. A sensing device responsive to rate of change of a given parameter comprising a frame, dash pot means mounted on the frame to afford resistance to motion which varies as a function of velocity of input motion, a rotatable shaft connected to the dash pot means, whereby shaft rotation of varying speed is opposed by varying reaction forces, a member mounted on the shaft for turning movement independent thereof, resilient means urging the member in one direction of turning, a sensing element responsive to the parameter to be sensed, said element having first and second portions relatively movable as a function of the parameter, means connecting the first portion to the said member to urge the latter to turn in opposition to the resilient means, means connecting the second portion to said shaft, the dash pot means and resilient means thereby reacting against each other through the agency of said sensing element, and means responsive to motion of said member.

7. Apparatus according to claim 6, including adjustable abutment means for fixing the starting position of the said member, and means to adjust the resilient means to vary the reaction force on said member opposing movement of the sensing elment.

8. A sensing device comprising a frame, a sensing element having first and second portions relatively movable as a function of a parameter to be sensed, resilient means reacting between the frame and the first portion of the element, a member movably mounted in a fluid medium, the medium thereby opposing movement of the member with a force that varies as a function of velocity, and means connecting the second portion of the element to the movable member, whereby said resilient means and movable member react against each other through the agency of the element and whereby said first portion of the element will move more than the second with a relatively rapid rate of change of the parameter and the second will move more than the first with lesser rate of change of the parameter.

9. Apparatus as set forth in claim 8, including work output means operatively connected to said first portion of the sensing element to be actuated upon movement thereof.

10. Apparatus as set forth in claim 9, including abutment means carried by the frame and disposed to arrest the movement of the second portion of the sensing element after movement of a preestablished amount, thereby to cause the work output means to be actuated after a preestablished value of the parameter being sensed has been reached.

11. A sensing device comprising a frame, a shaft rotatably mounted on the frame, a sensing element adapted to expand and contract as a function of the parameter to be sensed, said element spiraling about said shaft and having one end connected to the shaft, resilient means reacting between the other end of the element and the frame, a container for a fluid medium, a member movable in the container and driven by said shaft, whereby turning of the shaft is opposed by the resistance afforded by the fluid to movement of the movable member, and work output means connected to the element adjacent the said other end.

12. A sensing device comprising a frame, a shaft rotatably mounted on the frame, a sensing element adapted to expand and contract as a function of the parameter to be sensed, said element spiraling about said shaft and having one end attached thereto, a container for a fluid medium, a first member movable in the container and driven by said shaft, whereby turning of the shaft is opposed by the resistance afforded by the fluid to movement of the first member, a second member mounted on the shaft for turning movement independent thereof, means connecting the other end of the element to said second member, resilient means reacting between the frame and the second member to urge the latter in one direction of turning, and work output means connected to the element adjacent the said other end.

13. Apparatus as set forth in claim 12, including adjustable abutment means against which the resilient means urges the second member.

14. Apparatus as set forth in claim 12, including means to vary the reaction force of the resilient means.

15. Apparatus according to claim 11, said container being filled with a viscous fluid and said movable member comprising a rotor connected to the said shaft to turn therewith.

16. Apparatus according to claim 11, said sensing means comprising a bimetallic spiral responsive to temperature.

17. Apparatus according to claim 16, said work output means comprising alarm means, whereby the alarm means is actuated when the rate of change of temperature exceeds a predetermined value.

18. Apparatus according to claim 17, said alarm means including a control lever having on and off positions, and means movable with said other end of the sensing element engaging the lever to hold it normally in its off position.

19. Apparatus according to claim 18, including a wind-up motor having an expansible coil spring for driving said alarm means, and means responsive to expansion of the spring to indicate when the alarm means has been actuated.

20. Apparatus according to claim 19, including normally open electrical contact means, means responsive to expansion of the spring to close the contacts, and electrically actuated second alarm means connected in series with said contacts.

References Cited in the file of this patent

UNITED STATES PATENTS

| | | |
|---|---|---|
| 578,345 | Maxim | Mar. 9, 1897 |
| 776,955 | Sperling | Dec. 6, 1904 |
| 785,326 | Palmer | Mar. 21, 1905 |
| 1,829,067 | Shryock, et al. | Oct. 27, 1931 |
| 1,897,074 | Rees | Feb. 14, 1933 |
| 2,053,944 | Cooney | Sept. 8, 1936 |
| 2,484,145 | Bader | Oct. 11, 1949 |